(12) United States Patent
Muralimanohar et al.

(10) Patent No.: US 9,898,365 B2
(45) Date of Patent: Feb. 20, 2018

(54) GLOBAL ERROR CORRECTION

(71) Applicant: Hewlett-Packard Development Company, L.P., Houston, TX (US)

(72) Inventors: Naveen Muralimanohar, Palo Alto, CA (US); Doe Hyun Yoon, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/899,708

(22) PCT Filed: Jul. 31, 2013

(86) PCT No.: PCT/US2013/052930
§ 371 (c)(1),
(2) Date: Dec. 18, 2015

(87) PCT Pub. No.: WO2015/016880
PCT Pub. Date: Feb. 5, 2015

(65) Prior Publication Data
US 2016/0139989 A1    May 19, 2016

(51) Int. Cl.
*G06F 11/10* (2006.01)
*G06F 12/08* (2016.01)
(Continued)

(52) U.S. Cl.
CPC .......... *G06F 11/1076* (2013.01); *G06F 3/064* (2013.01); *G06F 3/0619* (2013.01);
(Continued)

(58) Field of Classification Search
CPC .. G06F 11/1076; G06F 11/00; G06F 11/1012; G06F 12/0866; G06F 13/16;
(Continued)

(56) References Cited

U.S. PATENT DOCUMENTS 5,127,014 A    6/1992    Raynham
6,760,814 B2    7/2004    Corrigan
(Continued)

FOREIGN PATENT DOCUMENTS

EP    2346197 A2    7/2011

OTHER PUBLICATIONS

Jian, X. et al., Adaptive Reliability Chipkill Correct (ARCC), (Research Paper), Jan. 10, 2013, 12 Pages.
(Continued)

*Primary Examiner* — Kyle Vallecillo
(74) *Attorney, Agent, or Firm* — Brooks, Cameron & Huebsch, PLLC

(57) ABSTRACT

A method that includes evaluating, with a controller, local error detection (LED) information in response to a first memory access operation is disclosed. The LED information is evaluated per cache line segment of data associated with a rank of a memory. The method further includes determining an error in at least one of the cache line segments based on an error detection code and determining whether global error correction (GEC) data for a first cache line associated with the at least one cache line segment is stored in a GEC cache in the controller. The method also includes correcting the first cache line associated with the at least one cache line segment based on the GEC data retrieved from the GEC cache in the controller without accessing GEC data from a memory.

15 Claims, 7 Drawing Sheets

(51) Int. Cl.
*G06F 3/06* (2006.01)
*G06F 12/0866* (2016.01)

(52) U.S. Cl.
CPC .......... *G06F 3/0673* (2013.01); *G06F 11/108* (2013.01); *G06F 11/1012* (2013.01); *G06F 12/0866* (2013.01); *G06F 2212/1032* (2013.01); *G06F 2212/281* (2013.01)

(58) Field of Classification Search
CPC ...... G06F 3/0619; G06F 3/064; G06F 3/0673; G06F 2212/1032; G06F 2212/281
See application file for complete search history.

(56) References Cited

U.S. PATENT DOCUMENTS

| | | | |
|---|---|---|---|
| 7,080,278 | B1 | 7/2006 | Kleiman et al. |
| 7,308,638 | B2 * | 12/2007 | Nerl ................ G06F 11/1012 714/763 |
| 7,606,980 | B2 | 10/2009 | Qureshi et al. |
| 7,844,880 | B2 | 11/2010 | Vainsencher et al. |
| 7,895,502 | B2 | 2/2011 | Han et al. |
| 7,979,753 | B2 | 7/2011 | Hoshizawa et al. |
| 8,041,990 | B2 | 10/2011 | O'Connor et al. |
| 8,055,979 | B2 | 11/2011 | Wu et al. |
| 8,127,205 | B2 | 2/2012 | Hirano et al. |
| 8,239,737 | B2 | 8/2012 | Agarwal et al. |
| 8,464,137 | B2 | 6/2013 | Franceschini et al. |
| 2004/0003337 | A1 | 1/2004 | Cypher |
| 2005/0015649 | A1 | 1/2005 | Lee et al. |
| 2005/0172207 | A1 | 8/2005 | Radke et al. |
| 2005/0188249 | A1 | 8/2005 | Hart et al. |
| 2007/0043997 | A1 | 2/2007 | Yang et al. |
| 2008/0163008 | A1 | 7/2008 | Jacob |
| 2008/0168329 | A1 | 7/2008 | Han et al. |
| 2009/0006886 | A1 | 1/2009 | O'Connor et al. |
| 2009/0070648 | A1 * | 3/2009 | Allison ................ G06F 11/106 714/746 |
| 2009/0222708 | A1 | 9/2009 | Yamaga |
| 2010/0217915 | A1 * | 8/2010 | O'Connor ........... G06F 12/0886 711/5 |
| 2010/0235711 | A1 | 9/2010 | Kim et al. |
| 2011/0214039 | A1 | 9/2011 | Steiner et al. |
| 2011/0289380 | A1 | 11/2011 | Wilkerson et al. |
| 2011/0320914 | A1 | 12/2011 | Alves et al. |
| 2012/0198310 | A1 | 8/2012 | Tran et al. |
| 2012/0331368 | A1 | 12/2012 | Yang et al. |
| 2013/0007542 | A1 * | 1/2013 | Carman ................ G06F 11/106 714/710 |
| 2013/0111303 | A1 | 5/2013 | Avudaiyappan et al. |
| 2013/0179752 | A1 | 7/2013 | Shim et al. |
| 2013/0268739 | A1 * | 10/2013 | Gupta ..................... G06F 3/065 711/162 |
| 2014/0040550 | A1 * | 2/2014 | Nale ................... G06F 13/1694 711/118 |
| 2016/0139988 | A1 | 5/2016 | Muralimanohar et al. |

OTHER PUBLICATIONS

PCT Search Report/Written Opinion ~ Application No. PCT/US2013/052922 dated Apr. 25, 2014 ~ 11 pages.
PCT Search Report/Written Opinion ~ Application No: PCT/US2013/052930 dated Apr. 18, 2014 ~ 11 pages.
Qin, F. et al., SafeMem: Exploiting ECC-Memory for Detecting Memory Leaks and Memory Corruption During Production Runs, (Research Paper), Nov. 10, 2004, 12 Pages.
Ron M. Roth, List Decoding of Burst Errors, Retrieved Dec. 11, 2015, 11 Pages.
Ron M. Roth, Reduced-Redundancy Product Codes for Burst Error Correction, IEEE Transactions on Information Theory, vol. 44, No. 4, Jul. 1998, 12 Pages.
Yoon, D.H. et al., Flexible Cache Error Protection using an ECC FIFO, (Research Paper), Aug. 6, 2009, 12 Pages.
Yoon, R., Intel® Technology Journal Memory Resiliency, (Research Paper), May, 2013, vol. 17, No. 1, 200 Pages.
PCT Search Report/Written Opinion ~ Application No. PCT/US2013/052916 dated Apr. 14, 2014 ~ 10 pages.

* cited by examiner

GLOBAL ERROR CORRECTION

CROSS-REFERENCE TO RELATED APPLICATIONS

This patent application is related to co-pending PCT Patent Application No. PCT/US2013/052922 and co-pending PCT Patent Application No. PCT/US2013/052916, concurrently filed herewith.

BACKGROUND

In modern, high-performance server systems that include complex processors and large storage devices, memory system reliability is a serious and growing concern. It is of critical importance that information in these systems is stored and retrieved without errors. If errors actually occur doing memory access operations, it is also important that these errors are efficiently detected and corrected.

DETAILED DESCRIPTION

Figure 1:
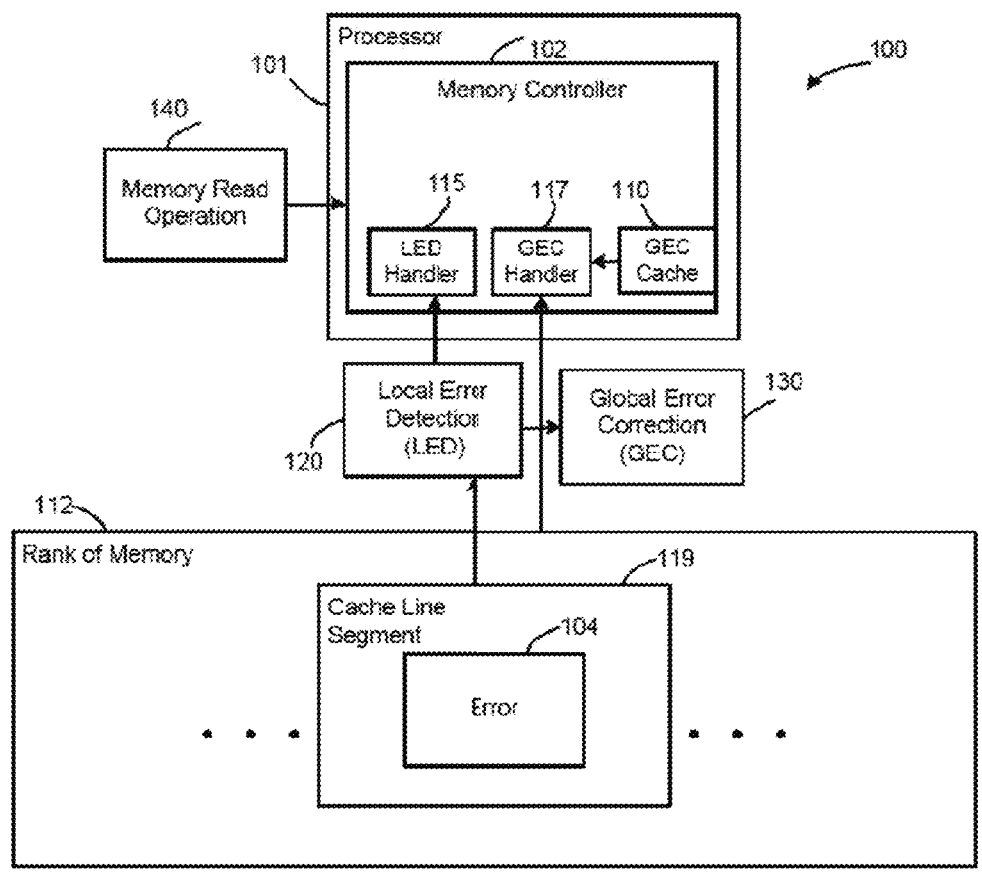
FIG. 1 is a schematic illustration of an example of a system including a global error correction ("GEC") cache in a memory controller.

A memory protection mechanism that provides better efficiency by offering a two-tier protection scheme that separates out error detection and error correction functionality is disclosed. The memory protection mechanism avoids one or more of the following: activation of a large number of memory chips during every memory access, increase in access granularity, and increase in storage overhead.

The first layer of protection is local error detection (LED), an immediate check that follows every access operation (i.e., read or write) to verily data fidelity. The LED information is attached to the data and a read request from the memory controller may automatically send the LED along with the data.

If the LED detects an error, the second layer of protection is then applied. The second layer of protection is the Global Error Correction (GEC), which may be stored in either the same row as the data segments or in a separate row that exclusively contains GEC information for several data rows. Unlike LED, the memory controller has to specifically request for GEC data of a detected failed cache line.

Therefore, detecting an error by the system does not incur any additional overhead. However, to correct an error, the memory controller of the system needs to perform an additional access operation to read the GEC information (i.e., the second layer of memory protection) in order to recover the data and to correct the error detected by the LED. If there are multiple accesses requests related to the failed data bank, the system performs two accesses for each request (i.e., a first access to perform LED and a second access to retrieve GEC information). This creates an additional overhead and increases the latency of the system.

The additional overhead created by the repeating accesses to the memory may be negligible if the error rate in the system is very low or the failed devices are isolated/changed aggressively. But with the shift to large capacity 3D stacked memory modules, or even with current DRAM memory devices with a failed column, it is likely that a system may access cache lines in a page containing failures more frequently due to locality in workloads.

In some implementations, the description proposes evaluating local error detection (LED) information in response to a first memory access operation, where the LED information is evaluated per cache line segment of data associated with a rank of a memory. The description further proposes determining an error in at least one of the cache line segments based on an error detection code and determining whether a global error correction (GEC) data for a first cache line associated with the at least one cache line segment is stored in a GEC cache in the controller. The GEC data for correcting the cache line associated with the at least one cache line segment is stored in the GEC cache during a previous memory access operation for obtaining GEC data to correct a second cache line associated with the rank of memory. The GEC data stored in the GEC cache during the previous memory access operation includes GEC data for correcting a plurality of adjacent cache lines. The description also proposes correcting the first cache line associated with the at least one cache line segment based on the GEC data retrieved from the GEC cache in the controller without accessing GEC data from the memory.

In other example implementations, the description proposes evaluating local error detection (LED) information in response to a memory access operation, where the LED information is evaluated per cache line segment of data associated with a chip in a rank of a memory. The description further proposes identifying a repeating error of a chip among a plurality of chips in the rank based on the LED information, determining a source of the repeating error of the chip, and dynamically adapting the LED information to correct the repeating error of the chip without an additional access to the memory to retrieve global error correction (GEC) information.

In the following detailed description, reference is made to the accompanying drawings, which form a part hereof, and in which is shown by way of illustration and specific examples in which the disclosed subject matter may be practiced. it is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

FIG. 1 is a schematic illustration of an example of a system 100 (e.g., a server system, a computer system, etc.) including a processor 101 (e.g., a central processing unit, etc.) having a global error correction ("GEC") cache 110 in a memory controller 102. The processor 101 may be implemented using any suitable type of processing system where at least one processor executes computer-readable instructions stored in a memory. In some examples, the system 100 may include more than one processor. The system 100 further includes a memory module 112 (represented as a rank of a dual-in-line memory module ("DIMM") in FIG. 1) and a system bus (e.g. a high-speed system bus; not shown). The system 100 also includes LED handler 115 and GEC handler 117 stored in the controller 102 for controlling the error/detection correction in the system 100. The LED handler 115 performs error detection based on received LED information and activates the GEC handler 117 when an error is detected. The GEC handler 117 retrieves GEC data and reconstructs the data in a cache line. In one example, the LED handler 115 and the GEC handler 117 may be implemented in hardware. In another example, the LED handler 115 and the GEC handler 117 may be implemented through a set of instructions and can be executed in software. The system 100 may include additional, fewer, or different components for carrying out similar functionality described herein.

When the LED handler 115 and the GEC 117 are implemented through a set of instructions, the handlers 115/117 may be stored in any suitable configuration of volatile or non-transitory machine-readable storage media. The machine-readable storage media are considered to be an article of manufacture or part of an article of manufacture. An article of manufacture refers to a manufactured component. Software stored on the machine-readable storage media and executed by the processor may include, for example, firmware, applications, program data, filters, rules, program modules, and other executable instructions. The controller may retrieve from the machine-readable storage media and executes, among other things, instructions related to the control processes and methods described herein.

The processor 101 and the memory controller 102 communicate with the other components of the system 100 by transmitting data, address, and control signals over the system bus (not shown). In some examples, the system bus includes a data bus, an address bus, and a control bus (not shown). Each of these buses can be of different bandwidth.

The general operation of the system is described in the following paragraphs. In response to a memory read operation 140, the system 100 is to use local error detection operation 120 and/or global error correction 130 operation to detect and/or correct an error 104 of a cache line segment 119 of the rank 112 of memory. In one example, system 100 is to compute local error detection (LED) information per cache line segment 119 of data. The cache line segment 119 is associated with a rank 112 of memory. The LED information is to be computed based on an error detection code. The system 100 may generate a global error correction (GEC) information for the cache line segment 119 (e.g., based on a global parity). The system 100 is to check data fidelity in response to memory read operation 140, based on the LED information, to identify a presence of an error 104 and the location of the error 104 among cache line segments 119 of the rank 112. The system 100 is to correct the cache line segment 119 having the error 104 based on the GEC in response to identifying the error 104.

In one example, the system 100 may use simple checksums and parity operations to build a two-layer fault tolerance mechanism, at a level of granularity down to a segment 119. The first layer of protection is local error detection (LED) 120, a check (e.g., an immediate check that follows a read operation 140) to verify data fidelity using LED data. The LED 120 can provide chip-level error detection (for chipkill, i.e., the ability to withstand the failure of an entire DRAM chip), by distributing LED information across a plurality of chips in a memory module. Thus, the LED information may be associated, not only with each cache line as a whole, but with every cache line "segment," i.e., the fraction of the line present in a single chip in the rank.

A relatively short checksum (e.g., 1's complement. Fletcher's sums, or other) may be used as the error detection code, and may be computed over the segment and appended to the data. The error detection code may be based on other types of error detection and/or error protection codes, such as cyclic redundancy check (CRC), Bose, Ray-Chaudhuri, and Hocquenghem (BCH) codes, and so on. The layer-1 protection (LED 120) may not only detect the presence of an error, but also pinpoint a location of the error, i.e., locate the chip or other location information associated with the error 104.

If the LED 120 detects an error, the second layer of protection may be applied—the Global Error Correction (GEC) 130. The GEC 130 may be based on a parity, such as an XOR-based global parity across the data segments 119 on the data chips in the rank 112 (e.g., N such data chips). The GEC 130 also may be based on other error detection and/or error protection codes, such as CRC, BCH, and others. In some examples, the GEC results may be stored in either the same now as the data segments, or in a separate row that is to contain GEC information for several data rows. Data may be reconstructed based on reading out the fault-free segments and the GEC segment, and location information (e.g., an identification of the failed chip based on the LED 120).

In some examples, the LED information and GEC information may be computed over the data words in a single cache fine. Thus, when a dirty fine is to be written back to memory from the processor, there is no need to perform a "read-before-write," and both codes can be computed directly, thereby avoiding impacts to write performance. Furthermore, LED information and/or GEC information may be stored in regular data memory, in view of a commodity memory system that may provide limited redundant storage for Error-Correcting Code (ECC) purposes. An additional read/write operation may be used to access this information along with the processor-requested read/write. Storing LED information in the provided storage space within each row may enable it to be read and written in tandem with the data fine. In some examples, the GEC information can be stored in data memory in a separate cache line since it can be accessed in the very rare case of an erroneous data read. Appropriate data mapping can locate this in the same row buffer as the data to increase locality and hit rates.

The memory controller 102 may provide data mapping, LED data/GEC data computation and verification, GEC information storage, and perform additional reads if required, etc. Thus, system 100 may provide full functionality transparently, without a need to notify and/or modify an Operating System (OS) or other computing system components. Setting apart some data memory to store LED data/GEC data may be handled through minor modifications associated with system firmware, e.g., reducing a reported amount of available memory storage to accommodate the stored LED data/GEC data transparently from the OS and application perspective.

Figure 2:
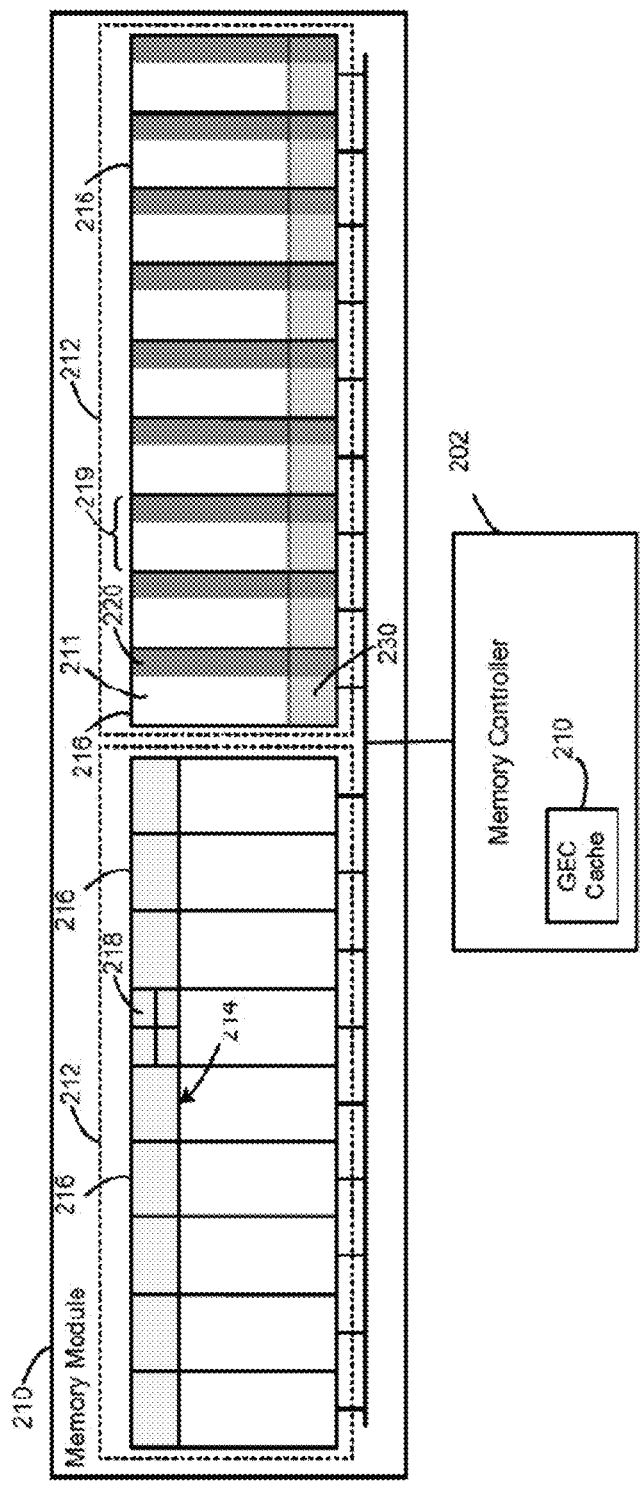
FIG. 2 illustrates a schematic representation showing an example of a memory module.

FIG. 2 is a schematic representation of an example of a memory module 210. The memory module 210 may interface with memory controller 202 and can send data, LED information, and GEC information to the memory controller 202. In one example, the memory module 210 may be a Joint Electron Devices Engineering Council (JEDEC)-style double data rate (DDRx, where x=1, 2, 3, . . . ) memory module, such as a Synchronous Dynamic Random Access Memory (SDRAM) configured as a dual in-line memory module (DIMM). Each DIMM may include at least one rank 212, and a rank 212 may include a plurality of DRAM chips 218. Two ranks 212 are shown in FIG. 2, each rank 212 including nine chips 216. A rank 212 may be divided into multiple banks 214, each bank distributed across the chips 218 in a rank 212. Although one bank 214 is shown spanning the chips in the rank, a rank may be divided into, e.g., 4-16 banks. Each bank 214 may be processing a different memory request. The portion of each rank 212/bank 214 in a chip 216 is a segment or a sub-bank 219. When the memory controller 202 issues a request for a cache line, the chips 216 in the rank 212 are activated and each segment 219 contributes a portion of the requested cache line. Thus, a cache line is striped across multiple chips 216.

In an example having a data bus width of 64 bits, and a cache line of 64 bytes, the cache line transfer can be realized based on a burst of 8 data transfers. A chip may be an xN part, e.g., x4, x8, x16, x32, etc. This represents an intrinsic word size of each chip 216, which corresponds to the number of data I/O pins on the chip. Thus, an xN chip has a word size of N, where N refers to the number of bits going in/out of the chip on each clock tick. Each segment 219 of a bank 214 may be partitioned into N arrays 218 (four are shown). Each array 218 can contribute a single bit to the N-bit transfer on the data I/O pins for that chip 216. An array 218 has a several rows and columns of single-bit DRAM cells.

In one example, each chip 216 may be used to store data 211, LED information about 220, and GEC information about 230. Accordingly, each chip 216 may contain a segment 219 of data 211, LED data 220, and GEC data 230. This can provide robust chipkill protection, because each chip can include the data 211, LED data 220, and GEC data 230 for purposes of identifying and correcting errors.

Figure 3:
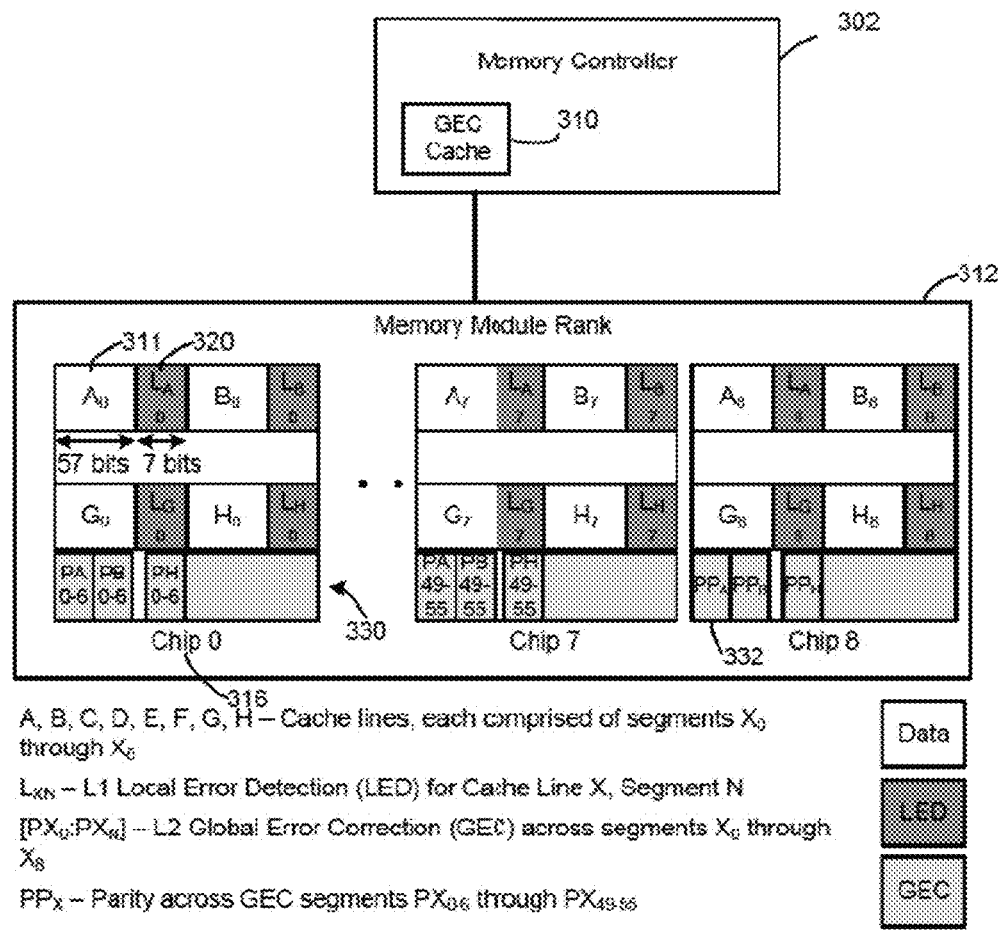
FIG. 3 is a schematic illustration showing an example of a memory module rank.

FIG. 3 is a schematic illustration showing an example of a memory module rank 312. In one example, the rank 312 may include N chips, e.g., nine x8 DRAM chips 316 (chip 0 . . . chip 8), and a burst length of 8. in alternate examples, other numbers/combinations of N chips may be used, at various levels of xN and burst lengths. The data 311, LED data 320, and GEC data 330 can be distributed throughout the chips 316 of the rank 312. The rank 312 includes a plurality of adjacent cache lines A-H each comprised of segments $X_0$-$X_8$, where the data 311, LED data 320, and GEC data 330 are distributed on the chips 316 for each of the adjacent cache lines.

In one example, LED data 320 can be used to perform an immediate check following every memory access operation (e.g., read operation) to verify data fidelity. Additionally, LED data 320 can be used identify a location of the failure, at a chip-granularity within rank 312. As noted above, to ensure such chip-level detection (required for chipkill), the LED data 320 can be maintained at the chip level (i.e., at every cache fine "segment," the fraction of the line present in a single chip 316 in the rank 312). Cache line A may be divided into segments A0 through A8, with the associated local error detection codes LA0 through LA8.

Each cache line in the rank 312 may be associated with 64 bytes of data, or 512 data bits, associated with a data operation, such as a memory access request. Because 512 data bits (one cache line) in total are needed, each chip is to provide 57 bits towards the cache line. For example, an x8 chip with a burst length of 8 supplies 64 bits per access, which are interpreted as 57 bits of data (A0 in FIG. 3, for example), and 7 bits of LED information 320 associated with those 57 bits (LA0). A physical data mapping policy may be used to ensure that LED bits 320 and the data segments 311 they protect are located on the same chip 316. One bit of memory appears to remain unused for every 576 bits, since 57 bits of data multiplied by 9 chips is 513 bits, and only 512 bits are needed to store the cache line. However, this "surplus bit" is used as part of the second layer of protection (e.g., GEC), details of which are described in reference to FIG. 4.

There are no performance penalties on either reads or writes due to the LED code 320. Every cache line access also reads/writes its corresponding LED information. Since the LED 320 is "self-contained," i.e., it is constructed from bits belonging to exactly one cache line, no read-before-write is needed—all bits used to build the code are already at the memory controller before a write. The choice of error detection code for the LED data 320 can depend on an expected failure mode. For example, a simple 1's complement addition checksum may be used for a range of expected failure modes, including the most common/frequent modes of memory failure.

The GEC data 330, also referred to as a Layer 2 Global Error Correction code, is to aid in the recovery of lost data once the LED data 320 (Layer 1 code) detects an error and indicates a location of the error. The GEC code 330 may be a 57-bit entity, and may be provided as a column-wise XOR parity of nine cache line segments, each a 57-bit field from the data region. For cache line A, for example, its GEC code 330 may be a parity, such as a parity PA that is a XOR of data segments A0, A1, . . . A8. Data reconstruction from the GEC 330 code maybe a non-resource intensive operation (e.g., an XOR of the error-free segments and the GEC 330 code), as the erroneous chip 316 can be flagged by the LED data 320.

Because there isn't a need for an additional dedicated ECC chip (what is normally used as an ECC chip on a memory module rank 312 is instead used to store data+LED data 320), the GEC code may be stored in data memory itself, in contrast to using a dedicated ECC chip. The available memory may be made to appear smaller than it physically is (e.g., by 12.5% overhead for storing LED data 320 and/or GEC data 330) from the perspective of the operating system, via firmware modifications or other techniques.

In order to provide strong fault-tolerance of one dead chip 316 in nine for chipkill, and to minimize the number of chips 316 touched on each access, the GEC code 330 may be placed in the same rank as its corresponding cache line. A specially-reserved region (lightly shaded GEC data 330 in FIG. 3) in each of the nine chips 316 in the rank 312 may be set aside for this purpose. The specially-reserved region may be a subset of cache lines in every DRAM page (row), although it is shown as a distinct set of rows in FIG. 3 for clarity. This co-location may ensure that any reads or writes to the GEC information 330 may produce a low-buffer hit when made in conjunction with the read or write to the actual data cache line, thus reducing any potential impacts to performance.

Figure 4:
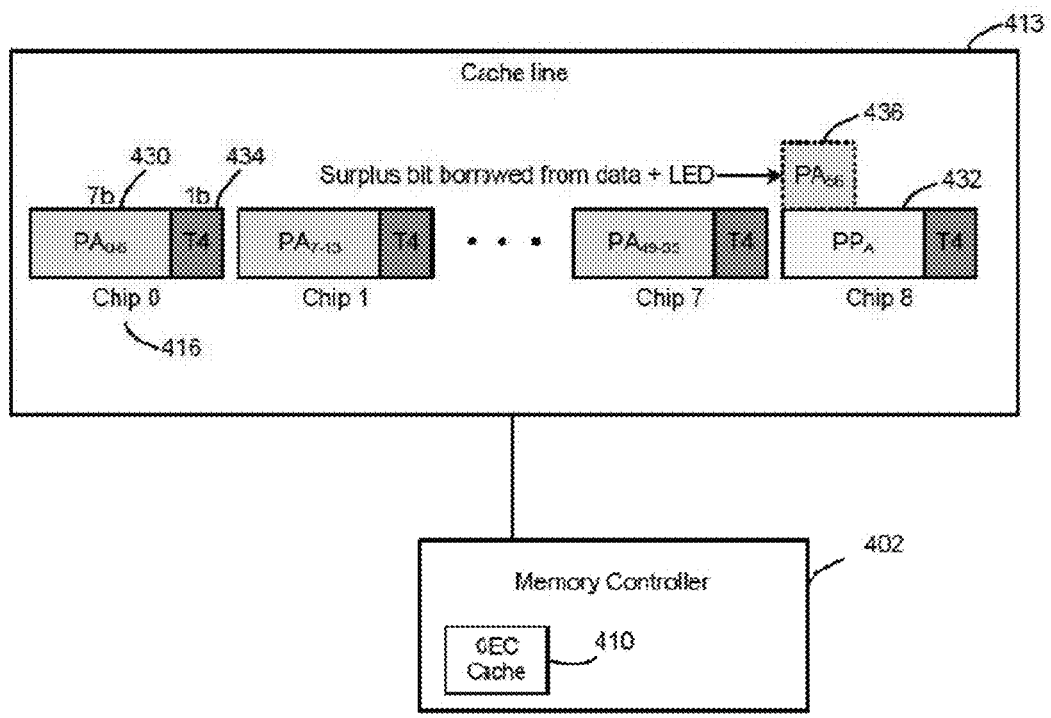
FIG. 4 is a schematic illustration showing an example of a cache line.

FIG. 4 is a schematic illustration showing an example of cache line 413 including a surplus bit 436. As noted above each rank may include a plurality of adjacent cache lines, where each of the chips in the rank includes GEC information. In one example, the GEC information 430 maybe laid out in a reserved region across N chips (e.g., Chip 0 . . . 8), for an example as cache line A, also illustrated in FIG. 3. The cache fine 413 also may include parity 432, tiered parity 434, and surplus bit 436. The adjacent cache lines (not shown) in the rank also have similar configuration of the GEC information.

Similar to the data bits as shown in FIG. 3, the 57-bit GEC data 430 may be distributed among all N (i.e., nine) chips 419 in the rank. For example, the first seven bits of the PA field (PA0-6) may be stored in the first chip 416 (Chip 0), the next seven bits (PA7-13) may be stored in the second chip (Chip 1), and so on. Bits PA49-55 may be stored on the eighth chip (Chip 7). The last bit, PA56 may be stored on the ninth chip (Chip 8), in the surplus bit 436. The surplus bit 436 may be borrowed from the Data+LED region of the Nth chip (Chip 8), as set forth above regarding using only 512 bits of the available 513 bits (57 bits×9 chips) to store the cache line.

The failure of a chip 416 also results in the loss of the corresponding bits in the GEC information 430 stored in that chip. The GEC code 430 PA itself, therefore, is protected by an additional parity 432, also referred to as the third tier $PP_A$. $PP_A$ in the illustrated example is a 7-bit field, and is the XOR of the N−1 other 7-bit fields, PA0-6, PA7-13, . . . , PA43-55. The parity 432 ($PP_A$ filed) is shown stored on the Nth (ninth) chip (Chip 8). If an entire chip 416 fails, the GEC 430 is first recovered using the parity 432 combined with uncorrupted GEC segments from the other chips. The chips 416 that are uncorrupted may be determined based on the LED, which can include an indication of an error's location, i.e., locate the failed chip). The full GEC data 430 is then used to reconstruct the original data in the cache line.

The tiered parity 434 or the remaining 9 bits of the nine chips 416 (marked T4, for Tier-4, in FIG. 4) may be used to bullet an error detection code across GEC bits $PA_0$ through $PA_{55}$, and $PP_A$ in some situations. One example, is a scenario where there are two errors present in the bank of chips (e.g., one of the chips has completely failed and there is an error in the GEC information in another chip). Note that neither exact error location information nor correction capabilities are required at this stage, because the reliability target is only to detect a second error, and not necessarily correct it. A code, therefore, may be built using various permutations of bits from the different chips to form each of the T4 bits 434.

Therefore, in the above-described example implementation, for each memory access operation involving a 64-byte (512-bit) cache line in a rank with nine x8 chips, the following bits may be used: 63 bits of LED information, at 7 bits per chip; 57 bits of GEC parity, spread across the nine chips; 7 bits of third-tier parity, $PP_X$; and 9 bits of T4 protection, 1 bit per chip. The above-identified configuration is only an example used to describe the proposed system and methods. It is to be understood the systems and methods described below can be implemented with wider I/O DRAM parts (e.g., x16, x32 DRAM, etc.) where each rank may include a different number of chips.

During a memory access operation, if the first tier of protection (i.e., LED) detects an error, the second layer of protection (i.e., GEC) is applied to correct the error (e.g., to reconstruct the original data in the cache line). Detecting an error by the system does not incur any additional overhead. However, in the above-described implementation of the system, the memory controller has to specifically request for GEC data of a detected failed cache line after the LEC detects an error.

Therefore, the system performs as additional memory access operation to read the GEC information every time an error is detected by the LED. For example, if there are multiple access requests related to the failed data bank (i.e., to a segment of the bank), the system always performs two accesses for each request (i.e., a first access to read data and LED and a second access to retrieve GEC information). Because of the specific structure of the example system, each access to the memory module may return a predetermined amount of GEC data to the memory controller (e.g., 72 bytes of GEC when the system includes a rank with nine x8 DRAM chips and a burst length of 8). This creates an additional overhead and increases the latency of the system.

For example, during LED, the memory controller receives 64 bytes of data and 8 bytes of LED information that may indicate that there is an error in at least one of the segments of the chips in the rank (i.e., in the 64 bytes of date for the cache line). In response to the detected error, the controller accesses the memory to request GEC data. During the GEC access, the memory controller may receive 72 bytes of GEC data. In one example, this GEC data is retrieved from the rank associated with the cache line requested in the first memory access, which was detected as erroneous by the LED. Thus, the GEC data to correct a cache line is retrieved for the entire cache line (i.e., from all segments in the chips that include the cache line). Each bank in a rank may include a plurality (e.g., eight) of cache lines, where the GEC data associated with all the cache lines is placed in each of the nine chips in the rank. Therefore, the GEC request from the memory controller may return 72 bytes of GEC data that include the GEC data for the failed cache line detected by the LED and GEC data for several adjacent cache lines (e.g., seven additional cache lines in the bank).

In some examples, when the memory controller receives the 72 bytes of GEC data, the controller may use the 8 bytes (64 bits) of GEC data associated with the failed cache line and discard the remaining 64 bytes of GEC data. This process may repeat each time the LED detects an error and the memory controller requests new GEC data associated with the failed cache line. These repeated accesses to the memory create an unnecessary error correction overhead.

In order to reduce the error correction overhead created by the repeated access to the memory module (i.e., during LED and then during GEC), this description proposes a system including a two tier protection for performing a memory access operation, where LED information (i.e., the first tier) is co-located with a cache line in the memory and is used to identify an error, and the GEC information (i.e., the second tier) is stored in a separate location and accessed separately. In one example, the system includes a GEC cache at the memory controller of the system, and the GEC cache is used to retrieve GEC data to correct the failed cache line without a separate access to the memory module.

Therefore, the memory controller of the proposed system may execute a process for global error correction without accessing the memory module of the system. For example, the controller can perform a first memory read operation and can receive GEC information associated with a first cache line having an error, where the error is determined based on LED information received at the controller with the first cache line. Further the controller can store the received GEC information in a GEC cache, can perform a subsequent second memory read operation, and can determine an error associated with a second cache line. In addition, the controller can access the GEC cache (e.g., by using the GEC handler 117) to retrieve GEC information related to the second cache line, and can correct the second cache line based on the GEC information retrieved from the GEC cache. The GEC information stored in the GEC cache based on the first memory read operation includes GEC data for correcting a plurality of adjacent cache lines.

One example, the GEC cache stores the GEC data related to at least the most recent memory access operation, where the LED detected an error in a cache line. Once the LED detects an error in a cache line (e.g., in a segment of a chip), the memory controller requests GEC data to correct the data in the failed cache line. Because of the structure of the memory module (e.g., where the GEC data is placed in the same rank as the corresponding cache line in a region in each of the nine x8 DRAM chips and a burst length of 8) and the fact that one rank is activated on every memory operation, each request for GEC may return 72 bytes of GEC data. The controller may use 8 bytes of GEC to correct the failed cache line. Instead of discarding the remaining 64 bytes of GEC data, the memory controller may store the originally received 72 bytes of GEC data in the GEC cache. In one example, the GEC cache can store GEC data from the most recent memory access (i.e., 72 bytes of GEC data). Thus, the GEC cache includes at least GEC data for the most recently accessed cache line and its adjacent cache lines. In other examples, the GEC cache can store GEC data from several of the most recent memory accesses for GEC (e.g., the GEC cache can store more than 72 bytes of GEC data).

For every cache line in the rank, the GEC information may include 57 bits of GEC parity spread across the nine chips; 7 bits of third-tier parity, $PP_X$; and 9 bits of T4 protection, 1 bit per chip. Therefore, when the memory controller receives 72 bytes of GEC data, that GEC data may include GEC for the failed cache line and GEC data for a plurality (e.g., seven) of adjacent cache lines in the rank. At least these 72 bytes of GEC data are stored in the GEC cache. In other example, the GEC cache may include GEC data based on several previous memory accesses. When each of these accesses is based on an error in a different cache line, the GEC cache may Include GEC data for all these recently accessed cache lines and their adjacent cache lines. Since the controller may only need 9 bytes (i.e., 72 bits) of GEC data to recover a cache line from a failed chip, to store GEC information for an entire page of size 8KB, it only takes 1 KB GEC cache. Thus, the size of the GEC cache may vary depending on the system's specifications. When the GEC cache is full, the least recently used GEC data is replaced with GEC data.

During a subsequent memory access operation, the system may determine that the same cache line or another cache line in the rank includes an error (i.e., by using the LED). Instead of repeatedly accessing the memory to retrieve GEC data for the failed cache line, the memory controller first checks the GEC cache to determine whether GEC data for the failed cache line is cached. If the GEC data for that cache line is stored in the GEC cache, the GEC data is retrieved from the GEC cache and used by the controller to correct the error in the cache line. If, on the other hand, the GEC cache does not include GEC data for the cache line, the memory controller initiates another access to the memory module to retrieve GEC.

Figure 5A:
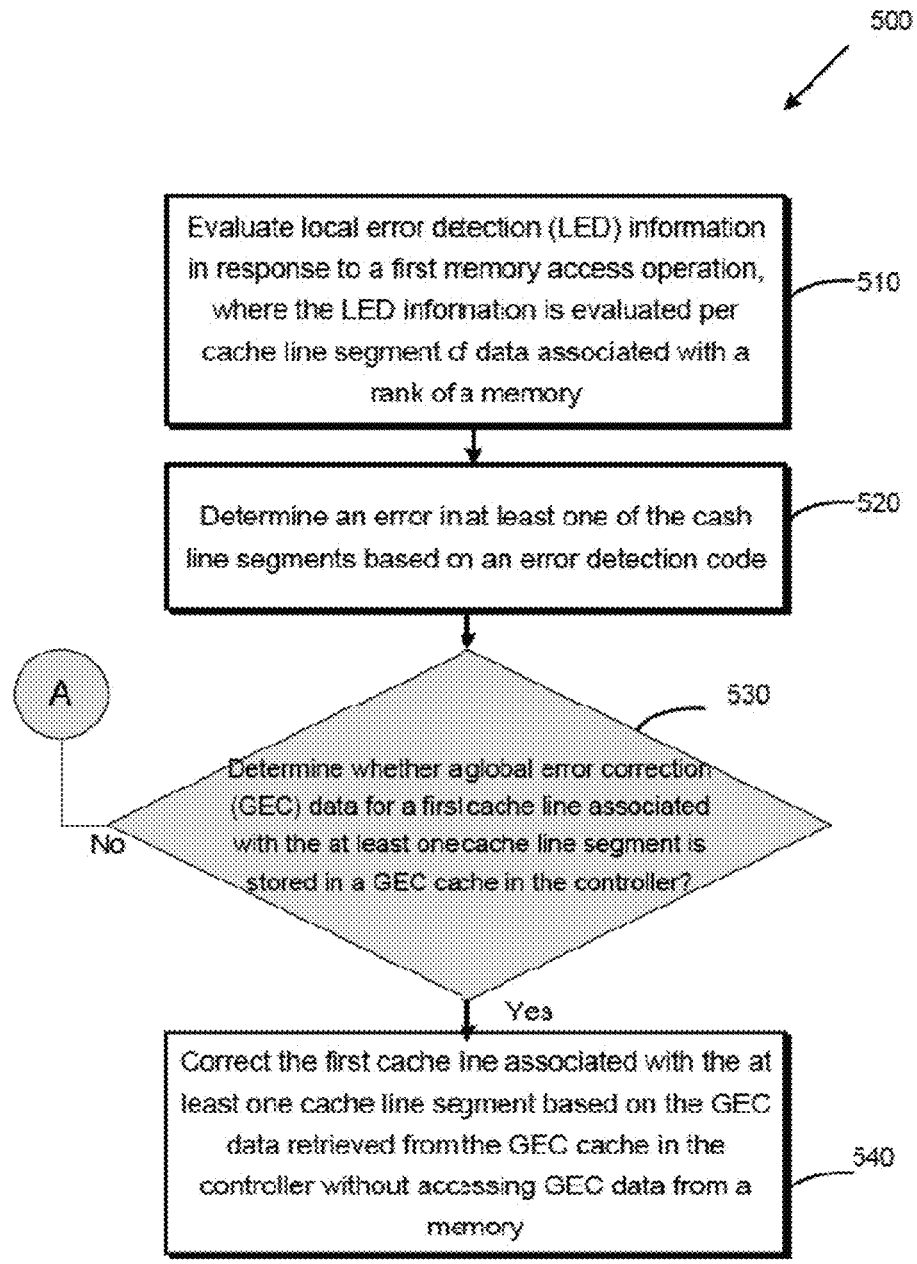
FIGS. 5A and 5B illustrate a flow chart showing an example of a method for correcting a cache line.
Figure 5B:
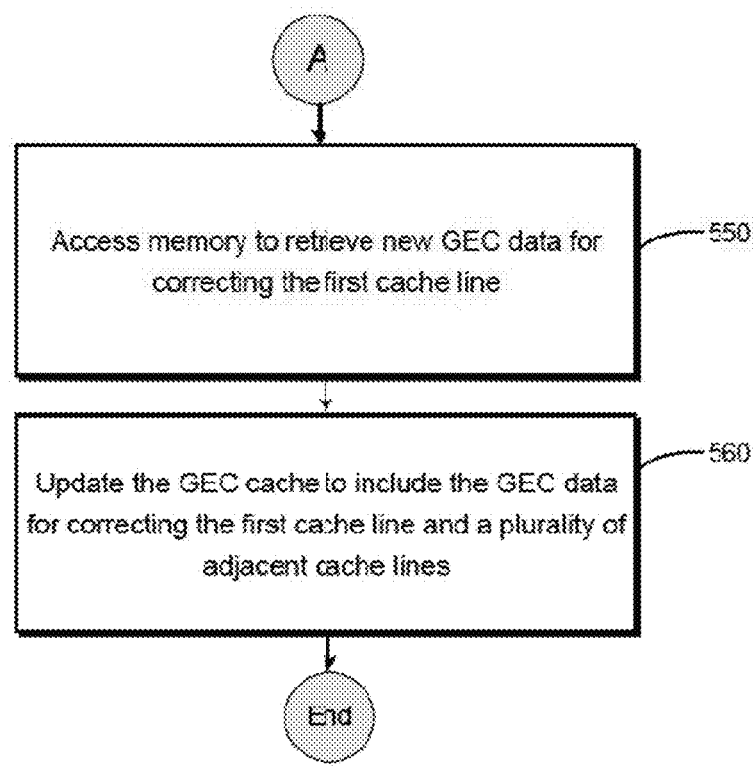

FIGS. 5 and 5A illustrate flow charts showing an example of a method 500 for correcting a cache line. In one example, the method 500 can be executed by the memory controller 102 of the processor 101. In other examples, the method 500 can be executed by a control unit of another processor (not shown) of the system. Various steps described herein with respect to the method 500 are capable of being executed simultaneously, in parallel, or in an order that differs from the illustrated serial manner of execution. The method 500 is also capable of being executed using additional or fewer steps than are shown in the illustrated examples. The method 500 may be executed in the form of instructions encoded on a non-transitory machine-readable storage medium executable by a processor 101. In one example, the instructions for the method 500 me be implemented by the LED handler 115 and the GEC handler 117.

The method 500 begins at step 510, where the system evaluates, with the memory controller, LED information in response to a first memory access operation. In some examples, the memory access operation is a memory read operation. The LED information may be evaluated per cache line segment of data associated with a rank of a memory. Alternatively, the LED information may be evaluated for the entire cache line of data. At step 520, the memory controller determines an error in at least one of the cache line segments based on an error detection code. The controller may determine the exact location of the error or may only point to the cache line segment that has the error. When the memory access operation is a read operation, the controller receives the data related to the cache line along with the LED data. When the LED data indicates that there is an error in the cache line, the controller determines whether GEC data for the first cache line associated with the at least one cache line segment is stored in a GEC cache in the controller (at step 530).

In one example, the GEC data for correcting the first cache line associated with the at least one cache line segment is stored in the GEC cache during a previous memory access operation for obtaining GEC data to correct another (i.e., second) cache line associated with the rank of memory. In some situations, the first cache line and the second cache line may be the same. The GEC data stored in the GEC cache during the previous memory access operation includes GEC data for correcting a plurality of cache lines adjacent to the second cache line. In other words, when the system performed an earlier memory read operation that detected an error, the controller received GEC data associated with the second cache line having an error and its adjacent cache lines.

As noted above, because the GEC data in the memory module is placed in the same rank as the corresponding cache line in a region in each of N chips (e.g., nine x8 DRAM chips with a burst length of 8), each request for GEC may return 72 bytes of GEC data. Only 8 bytes of GEC may be used to correct the failed cache line. However, the received 72 bytes of GEC data may be stored in the GEC cache. For example, when the GEC data in the GEC cache is related to one recently accessed cache line, the GEC cache may include data for a plurality (e.g., at least seven) of adjacent cache lines in the rank. Alternatively, when the GEC cache has a larger size, the GEC data stored in the GEC cache may include GEC data for a plurality of cache lines that are adjacent to several recently accessed cache lines (e.g., if the last three accesses determined errors in three different cache lines, the GEC cache may include data for correcting at least 24 cache lines).

Therefore, when the controller performs a subsequent memory read operation (called a first memory access operation as described above) that determines an error associated with the first cache line, the GEC cache may already include GEC data for that cache line. This situation may occur when the requested cache line was previously accessed and its GEC data was stored in the cache, or when the requested cache line is adjacent to one of the previously accessed cache lines.

With continued reference to FIG. 5A, if the controller determines that GEC data for the first cache line associated with the at least one cache line segment is stored in the GEC cache, the controller corrects the first cache line based on the GEC data retrieved from the GEC cache in the controller without accessing GEC data from a memory (at step 540). Alternatively, if the controller determines that that GEC data for the first cache line associated with the at least one cache line segment is not stored in the GEC cache, the controller accesses the memory module to retrieve new GEC data for correcting the first cache line associated with the at least one cache line segment (at step 550). Then, at step 560, the controller updates the GEC cache with the new GEC data that also includes data for correcting a plurality of adjacent cache lines that are adjacent to the accessed cache line. When the memory access operation is a memory write operation and when the memory controller determines that GEC data for the first cache line associated with the at least one cache line segment is stored in the GEC cache, the controller updates the GEC data for the cache line with new GEC data. For write operations where the controller determines that GEC data for the first cache line associated with the at least one cache line segment is not stored in the GEC cache, the controller may directly write to the memory nodule (i.e., both data/LED and GEC). The proposed method 500 reduces the error correction overhead of the system.

Figure 6:
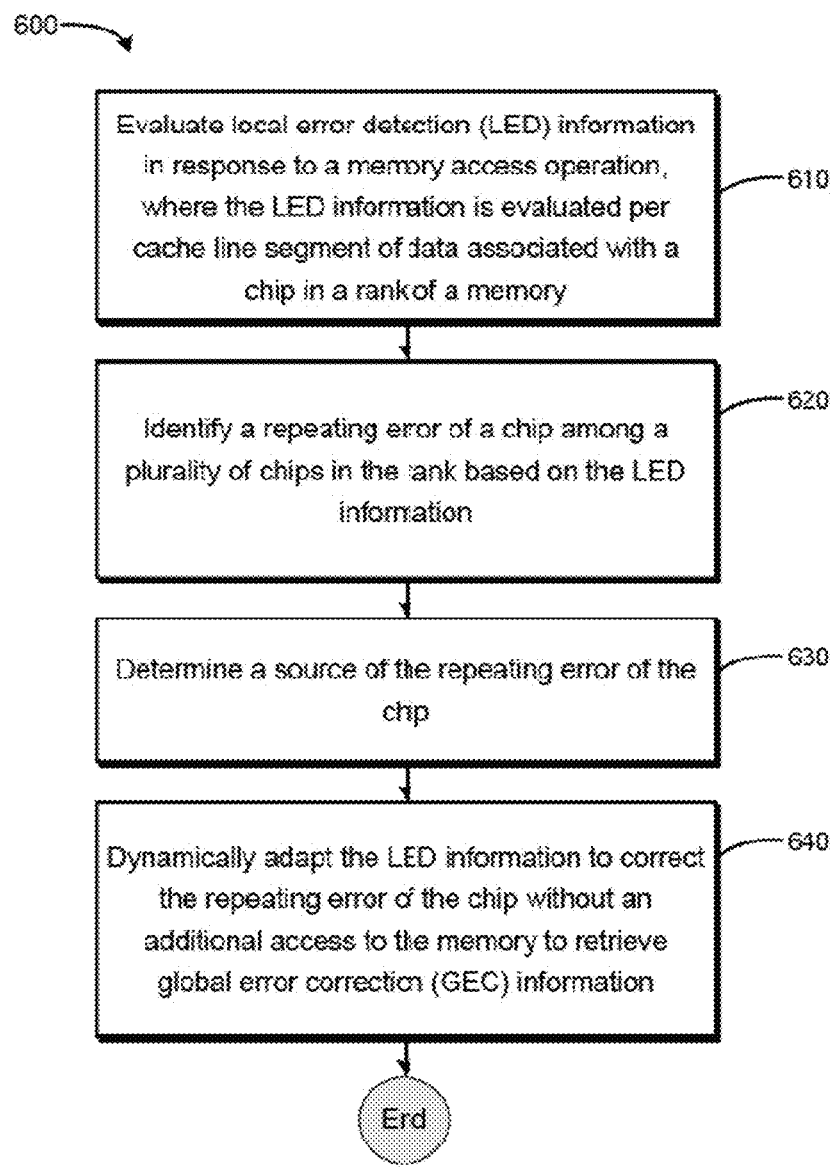
FIG. 6 illustrates a flow chart showing an example of an alternative method for correcting a cache line.

FIG. 6 illustrates a flow chart showing an example of an alternative method 600 for correcting a cache line. In one example, the method 600 can be executed by the memory controller 102 of the processor 101. Various steps described herein with respect to the method 600 are capable of being executed simultaneously, in parallel, or in an order that differs from the illustrated serial manner of execution. The method 600 is also capable of being executed using additional or fewer steps than are shown in the illustrated examples. The method 600 may be executed in the form of instructions encoded on a non-transitory machine-readable storage medium executable by a processor 101. In one example, the instructions for the method 600 may be implemented by the LED handler 115 and the GEC handler 117.

The method 600 proposes using the LED data to both detect and correct failures in the cache lines in order to improve the GEC process and to reduce the error correction overhead of the system. The method 600 begins at step 610 where the controller evaluates LED information in response to a memory access operation (e.g., memory read). In some examples, the LED information is evaluated per cache line segment of data associated with a chip in a rank of a memory. At step 620, the controller identifies a repeating error of a chip among a plurality of chips in the rank based on the LED information. As noted above, the memory includes at least one rank having a plurality of chips. During multiple memory access operations, the controller may identify when a particular chip in the rank returns an error on multiple occasions.

Next, at step 630, the controller determines a source of the repeating error of the chip. In some examples, the repeating error of the chip may be based on a failure of an input/output pin of the chip, a failed column, a failed row, or a failed column and a row. The error in the chip may affect all the cache lines in that chip (e.g., there may always be at least one bit failure during a memory read operation). When the controller has determines that a repeating error exists and has identified the source of the error, the controller dynamically adapts the LED information to correct the repeating error of the chip without an additional access to the memory to retrieve GEC information (at step 640).

In one example, dynamically adapting the LED information to correct the repeating error includes using a portion of tine LED information of each chip in the rank to correct the repeating error. As noted above, each chip in the rank may include data, LED information related to the data, and GEC information. In one of the described examples, for each cache line, each chip may transfer 57 bits of data and 7 bits of LED to the controller. For example, in the proposed method 600, the controller may replace the 7 bits of LED information transferred from each chip with 6 bits of LED information. The additional bits may be used to recover from the failure in the specific chip without accessing the memory again to retrieve GEC data.

For example, in the scenario with 57 bits of data and 7 bits of LED data received from each chip, the controller may determine that data bit two from a particular chip is failing repeatedly. The address of the failing bit is stored in the first portion of LED data (e.g., 6 bits). The remaining LED data (e.g., 1 bit) may store simple parity information. The memory controller is notified that this is not a normal LED data. When the controller accesses that cache line, the first portion of LED is used to determine which bit is failing and the second portion of LED is used to correct the bit. It is to be understood that alternative methods for correcting a failure in a chip by only using LED data can be implemented.

The invention claimed is:

1. A method, comprising:
   evaluating, with a controller, local error detection (LED) information in response to a first memory access operation, where the LED information is evaluated per cache line segment of data associated with a rank of a memory;
   determining, with the controller, an error in at least one of the cache line segments based on an error detection code;
   determining, with the controller, whether global error correction (GEC) data for a first cache line associated with the at least one cache line segment is stored in a GEC cache in the controller;
   correcting, with the controller, the first cache line associated with the at least one cache line segment based on the GEC data retrieved from the GEC cache in the controller without accessing GEC data from the rank of the memory; and
   dynamically adapting, with the controller, the LED information to correct a repeating error without an additional access to the rank of the memory to retrieve GEC information by:
      removing a first number of bits of the LED information unrelated to an address of the error;
      retaining a second number of bits of the LED information in a first portion to indicate the address of the error; and
      replacing the first number of bits with a third number of bits in a second portion of the LED information with a data value to correct the repeating error.

2. The method of claim 1, wherein the GEC data for correcting the first cache line associated with the at least one cache line segment is stored in the GEC cache during a previous memory access operation for obtaining GEC data to correct a second cache line associated with the rank of memory.

3. The method of claim 2, wherein the GEC data stored in the GEC cache during the previous memory access operation includes GEC data for correcting a plurality of cache lines adjacent to the second cache line.

4. The method from claim 3, wherein the GEC cache further includes GEC data for a plurality of cache lines that are adjacent to several recently accessed cache lines.

5. The method of claim 1, further comprising retrieving, from the rank of the memory, new GEC data for correcting the first cache line associated with the at least one cache line segment when the GEC cache does not include GEC data for correcting the first cache line, and updating the GEC cache with the new GEC data.

6. The method of claim 1, wherein the first memory access operation is a memory read operation, and wherein the method further comprises updating the GEC data in the GEC cache in response to a memory write operation.

7. A system for performing a memory read operation, the system comprising:
- a memory; and
- a processor having a memory controller in communication with the memory, the memory controller to:
  - perform a first memory read operation,
  - receive global error correction (GEC) information associated with a first cache line having an error, where the error is determined based on a local error detection (LED) information received at the memory controller with the first cache line,
  - store the received GEC information in a GEC cache,
  - perform a subsequent second memory read operation,
  - determine an error associated with a second cache line,
  - access the GEC cache to retrieve GEC information related to the second cache line,
  - correct the second cache line based on the GEC information retrieved from the GEC cache, and
  - dynamically adapt, with the memory controller, the LED information to correct a repeating error without an additional access to the rank of the memory to retrieve GEC information by:
    - remove a first number of bits of the LED information unrelated to an address of the error;
    - retain a second number of bits of the LED information in a first portion to indicate the address of the error; and
    - replace the first number of bits with a third number of bits in a second portion of the LED information with a data value to correct the repeating error.

8. The system of claim 7, wherein the GEC information stored in the GEC cache based on the first memory read operation includes GEC data for correcting a plurality of adjacent cache lines.

9. The system of claim 8, wherein the plurality of adjacent cache lines are adjacent to several recently accessed cache lines.

10. The system of claim 7, wherein the GEC cache is stored in the memory controller.

11. The system of claim 7, wherein the memory controller is to update the GEC cache with new GEC information, when the GEC information for correcting the second cache line is not stored in the GEC cache.

12. The system of claim 7, wherein the first cache line and the second cache line are the same.

13. A method, comprising:
- evaluating, with a controller, local error detection (LED) information in response to a memory access operation, where the LED information is evaluated per cache line segment of data associated with a chip in a rank of a memory;
- identifying, with the controller, a repeating error of a chip among a plurality of chips in the rank based on the LED information;
- determining, with the controller, a source of the repeating error of the chip; and
- dynamically adapting, with the controller, the LED information to correct the repeating error of the chip without an additional access to the memory to retrieve global error correction (GEC) information by:
  - removing a first number of bits of the LED information unrelated to an address of the source;
  - retaining a second number of bits of the LED information in a first portion to indicate the address of the source; and
  - replacing the first number of bits with a third number of bits in a second portion of the LED information with a data value to correct the repeating error.

14. The method of claim 13, wherein dynamically adapting the LED information to correct the repeating error includes using a portion of the LED information of each chip in the rank to correct the repeating error.

15. The method of claim 13, wherein the source of the error in the chip includes a failure of an input/output pin of the chip, a failed column, a failed row, or a failed column and a row.

* * * * *